Figure 1:
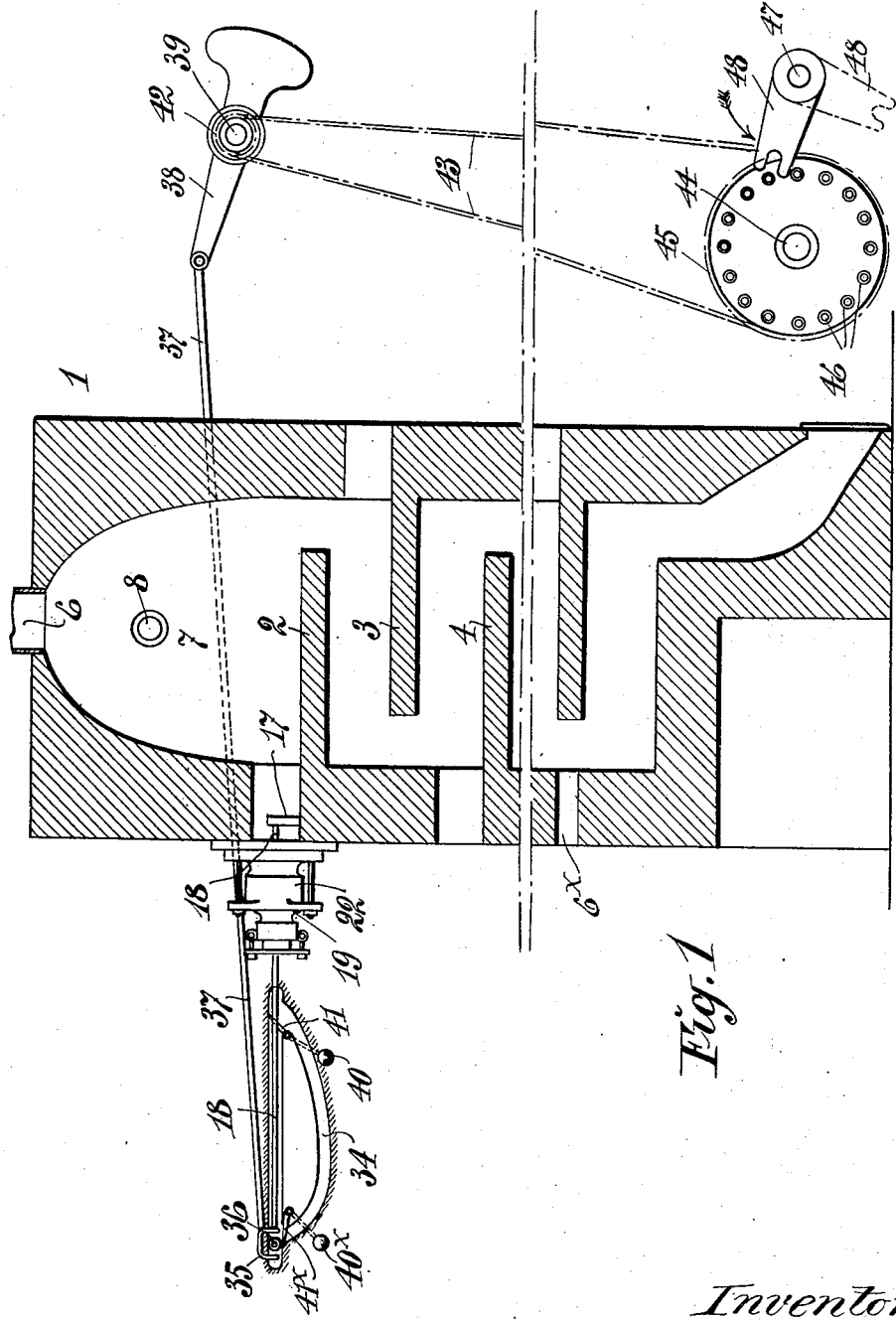

O. F. S. AND O. I. CARLSON AND K. G. BOMAN.
FURNACE FOR EFFECTING REACTIONS BETWEEN ONE OR MORE SOLID SUBSTANCES AND ONE OR MORE GASEOUS SUBSTANCES.
APPLICATION FILED JULY 29, 1916.

1,305,441.

Patented June 3, 1919.

4 SHEETS—SHEET 1.

Inventors:
Oscar Fredrik Svante Carlson
Oscar Ivar Carlson and
Karl Gottfrid Boman
by attorneys

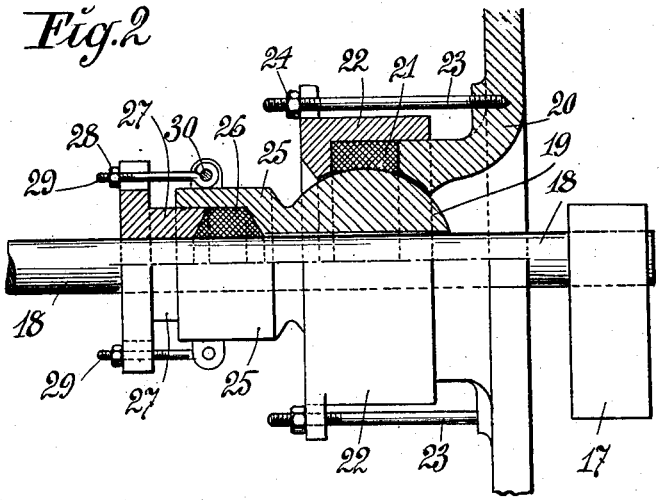
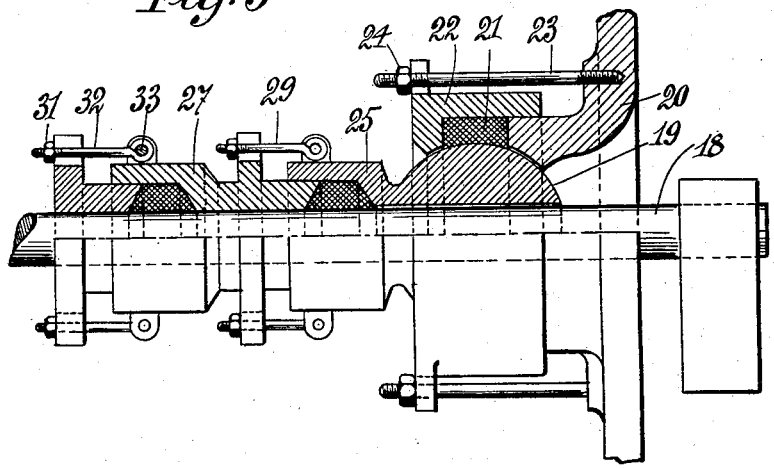

O. F. S. AND O. I. CARLSON AND K. G. BOMAN.
FURNACE FOR EFFECTING REACTIONS BETWEEN ONE OR MORE SOLID SUBSTANCES AND ONE OR MORE GASEOUS SUBSTANCES.
APPLICATION FILED JULY 29, 1916.
1,305,441.
Patented June 3, 1919.
4 SHEETS—SHEET 3.
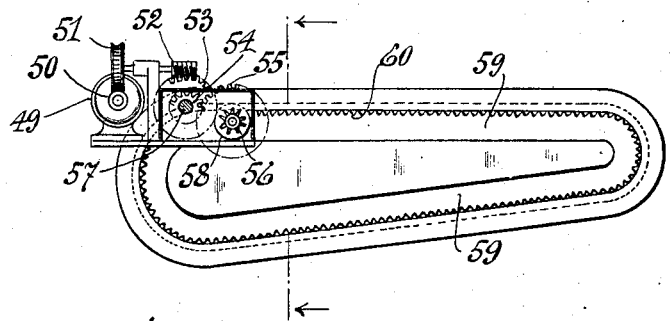
Fig. 4
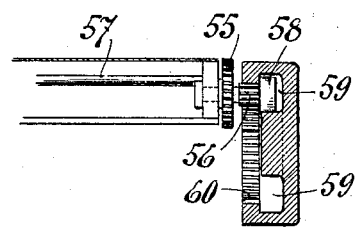
Fig. 5
Fig. 6
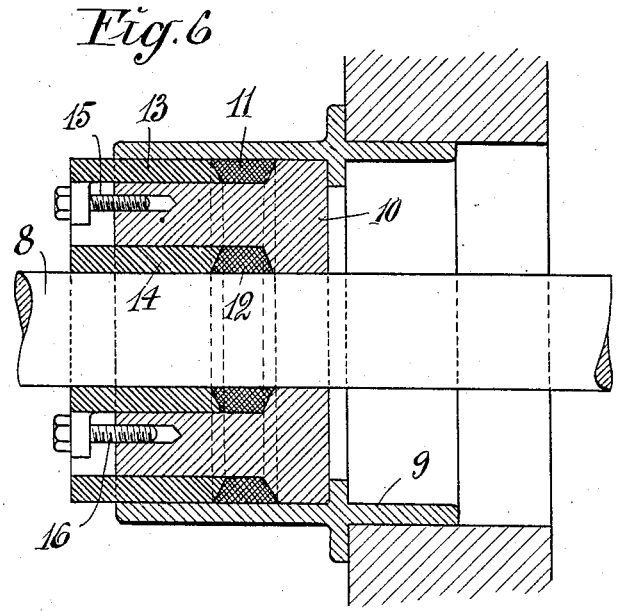
Inventors:-
Oscar Fredrik Svante Carlson
Oscar Ivar Carlson and
Karl Gottfrid Boman
by attorneys O. F. S. AND O. I. CARLSON AND K. G. BOMAN.
FURNACE FOR EFFECTING REACTIONS BETWEEN ONE OR MORE SOLID SUBSTANCES AND ONE OR MORE GASEOUS SUBSTANCES.
APPLICATION FILED JULY 29, 1916.

1,305,441.

Patented June 3, 1919.
4 SHEETS—SHEET 4.

UNITED STATES PATENT OFFICE.

OSCAR FREDRIK SVANTE CARLSON, OF LJUNGAVERK, OSCAR IVAR CARLSON, OF STOCKHOLM, AND KARL GOTTFRID BOMAN, OF LJUNGAVERK, SWEDEN, ASSIGNORS TO AKTIEBOLAGET NITROGENIUM, OF STOCKHOLM, SWEDEN, A CORPORATION OF SWEDEN.

FURNACE FOR EFFECTING REACTIONS BETWEEN ONE OR MORE SOLID SUBSTANCES AND ONE OR MORE GASEOUS SUBSTANCES.

1,305,441.  Specification of Letters Patent.  Patented June 3, 1919.

Application filed July 29, 1916. Serial No. 112,066.

*To all whom it may concern:*

Be it known that we, OSCAR FREDRIK SVANTE CARLSON, a subject of the King of Sweden, and resident of Ljungaverk, in the Kingdom of Sweden, OSCAR IVAR CARLSON, a subject of the King of Sweden, and resident of Kornhamnstorg 4, Stockholm, in the Kingdom of Sweden, and KARL GOTTFRID BOMAN, a subject of the King of Sweden, and resident of Ljungaverk, in the Kingdom of Sweden, have invented certain new and useful improvements in furnaces for effecting reactions between one or more solid substances and one or more gaseous substances, of which the following is a specification, reference being had therein to the accompanying drawings.

For the effecting of reactions between solid and gaseous substances in furnaces it is advantageous for the hastening of the reaction to stir the matter. If the furnace is arranged in accordance with the multistage system, *i. e.* if the furnace is provided with shelves, which are located one above another and from which the solid substance or substances are moved from shelf to shelf, such a movement is preferably imparted to the stirring implements, that they pass along the shelves, when moved in one direction, and, while they return, are raised from the shelves and pass above the same along a suitable path. One of the objects of the present invention is to provide means through which the said movement or any similar movement in a plurality of directions can be effected without the chamber of the furnace being put into communication with the atmospheric air, which communication in many cases would have an injurious influence upon the reaction or is less desirable. The said means consist of a ball, a cylinder of any similar rotary body, which fits closely to the wall of the furnace by means of packing and is provided with an opening in which the shaft of the implement is reciprocated, packing being provided also between the said shaft and the body. For imparting to the stirring implement the said movement the outer end of the shaft is, according to this invention, fixed to a crosshead piece or beam or the like which passes in a guide of a shape corresponding to the shape of the path of the implement. Two guides of the same construction and located at opposite ends of the said beam are preferably used for guiding the same. For moving the said crosshead beam and the stirring implement any suitable means may be used, for instance a crank with pitman and actuated by one or more chain gearings, one or more screw gearings, one or more spur gearings or combinations of gearings of the said kinds, a hydraulic device, an electric motor located on the crosshead piece or beam and so on. If the furnace is arranged in accordance with multistage system, the stirring implements are caused to operate preferably successively or in a desired order. For this purpose many different means may be used dependent on the type of the actuating device, as more closely stated in the following description. This invention also comprises suitable stirring implements adapted to different kinds of substances.

Figure 7:
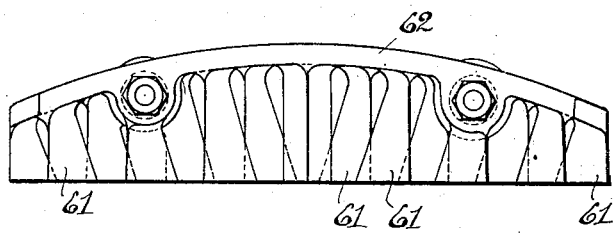
Figure 8:
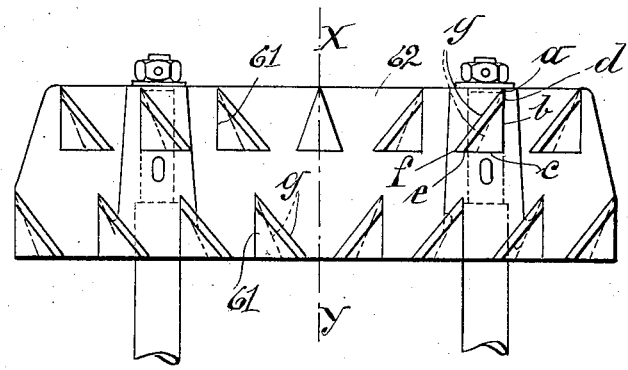

In the accompanying drawings Figure 1 shows diagrammatically and in a vertical section a furnace which is arranged in accordance with the multistage system and the stirring implements of which are provided at their shafts with ball joints of the type stated above and are caused to move in a certain path by guides also of the type stated above. The stirring implements are actuated by cranks and pitmen. Fig. 1 also shows means for causing the stirring implements to operate one after another. Fig. 2 shows in a longitudinal section one of the ball joints and its packing boxes. Fig. 3 shows in a longitudinal section a ball joint provided with two packing boxes located around the shaft of the stirring implement. Figs. 4 and 5 show in a side view and in a vertical cross section respectively a crosshead beam carrying an electric motor for the actuating of the stirring implement or implements; the said figures also show the guides of the crosshead beam. Fig. 6 shows in a longitudinal section a packing device for the electrodes used in the furnace. Figs. 7 and 8 show a stirring implement viewed from one side and from below respectively.

1, Fig. 1, is the furnace provided with the shelves 2, 3, 4, 5... The matter to be treated is introduced into a chamber 7 through an opening 6, which chamber is provided with an electric heating device, for instance two electrodes 8 passed through openings provided in opposite walls of the furnace. The gas is introduced through an opening 6ˣ. The matter is heated in the chamber 7 to a temperature suitable for the starting of the reaction. For preventing gas from escaping from the furnace at the said electrodes the arrangement shown in Fig. 6 may be used. In the opening provided in the wall of the furnace for the electrode a cylinder 9 of metal is mounted into which a ring 10 is passed. One part of the said ring has the same diameter as the cylinder 9 inside and another part of the ring is so adapted, that between the same and the cylinder 9 and the electrode 8 respectively spaces are provided inclosing packing rings 11, 12 of asbestos for instance, and covers 13, 14, which are forced against the packing rings 11, 12 by means of screws 15, 16 engaging the ring 10. Owing to the said arrangement packing is provided between the electrode and the ring 10 as well as between the latter and the cylinder 9. The electrodes are moved into the furnace as required and by any suitable means and either manually or automatically by an electric controlling device.

17 is a stirring implement fixed to the shaft 18. Only one stirring device is shown in Fig. 1; a stirring device being however provided at each shelf. In order that the said implement 17 may be moved in a straight path along the shelf, for stirring the matter and causing a part of the same to fall down on the next shelf, and then return along a path located above the shelf, so that the implement does not bring along with itself any part of the matter during the return stroke, the shaft 18 is passed through a ball shaped body 19, mounted in a packing box comprising a carrier 20 fixed to the wall of the furnace, a packing substance 21 and a cover 22, which is tightened by means of screw bolts 23, fixed to the carrier, and by means of nuts 24. From the ball shaped body 19 a cylindrical part 25 extends, forming the outer casing of a packing box provided between the shaft 18 and the ball shaped body 19. In the casing 25 a packing substance 26 and a cover 27 are located, which cover is tightened by means of nuts 28, provided on bolts 29, which are hooked on pins 30 on the cylindrical part 25.

Owing to the described arrangement the stirring implement may be swung in any direction while fitting closely to the furnace. Two or more packing boxes may be provided between the shaft 18 and the ball shaped body. In Fig. 3 two packing boxes are shown. The cover 27 of the box arranged in the cylindrical part 25 forms the casing of a second packing box, the cover of which is held and may be tightened by means of nuts 31 and screw bolts 32 hooked on pins 33 on the cover or casing 27.

Instead of the ball shaped body 19 a cylindrical body may be used, the longitudinal axis of which forms a right angle with the plane of the drawing and in which a transversal opening for the shaft of the implement is provided. The said cylindrical body is provided with packing devices not only at its periphery but also at its ends, packing devices being also provided between the shaft of the implement and the cylindrical body, similar to the packing devices shown in Figs. 2 and 3. Instead of packing boxes at the periphery of the ball shaped or cylindrical body packing rings may be used, arranged for instance in the same manner as the packing rings of the working piston of a steam engine. Each stirring implement may have two shafts with packing means in accordance with the means stated above.

For causing the stirring implements to move first inward along the shelves 2, 3, 4, . . . respectively and then along a path above the shelf backward to the starting position a guide 34 is provided, shown diagrammatically in Fig. 1. Preferably two parallel guides are provided, one for each end of a crosshead beam 35, in which the shaft or shafts 18 of one or more stirring implements 17 are fixed. On the said beam 35 rollers 36 are provided running in the guides. The beam 35 is moved forward and backward by two pitmen 37, pivoted to the ends of the beam and connected with cranks 38 provided on a shaft 39, which is rotated in the manner stated below. The guide 34 has a straight, horizontal part, which guides the beam 35, while it moves the stirring implement inward on the shelf 2. When the implement has arrived to the inner end of the shelf and is moved backward, the cross head beam 35 has arrived to the right end of the guide 34. As the beam 35 returns it is caused by a switch 41, acted upon by a weight or the like, to pass into a curve shaped lower part of the guide, which connects the ends of the straight part. While the beam 35 passes through the said curve shaped part, the outer end of the shaft 18 is lowered and consequently the stirring implement 17 raised, so that it is returned along a path located above the shelf 2. At the left end of the guide 34 also a switch 41ˣ acted upon by a weight 40ˣ is provided.

The stirring implement 17 is actuated preferably intermittently, which, according to Fig. 1, is effected by means of a sprocket wheel 42, fixed to the shaft 39, a chain 43, a sprocket wheel 45, which rotates freely on a shaft 44 and is arranged like a roller wheel 46 or combined with such a wheel, and by means of a toothed segment fixed to a shaft 47. The said shaft 47 is rotated by a suitable motor in the direction indicated by the arrow and when the toothed segment 48 engages the roller wheel 46, the sprocket wheel 45 is rotated through such an angle, that the crank 38 is rotated through a full revolution and the implement 17 is moved forward and backward and then stops. By means of the said driving mechanism the implements 17 may easily be caused to operate in proper turns, one after another, or in any other order, which may be effected by changing the angular position of the toothed segments 48 on the shaft 47, so that they form an angle one with another, as indicated in Fig. 1.

Instead of the implements being actuated by a common motor, as in Fig. 1, an electric motor may be mounted on each crosshead beam, as shown diagrammatically in Figs. 4 and 5. On the said beam a motor 49 is mounted, which by means of a screw gearing 50, 51 a second screw gearing 52, 53, and a spur gearing 54, 55 rotates a toothed wheel 56, mounted on a pivot provided in the end of the beam. The toothed wheel 54 is fixed to a shaft 57, extending longitudinally of the beam. On the opposite end of the shaft 57 a toothed wheel is fixed meshing with a toothed wheel 56, corresponding to the toothed wheel 56. A smooth wheel or roller 58, made integral with the toothed wheels 56 respectively, runs in a guide 59, corresponding to the guide 34. A guide 59 is provided at each end of the beam. In one side of the guides respectively teeth 60 are provided, engaged by the toothed wheel 56. When the motor 49 is started, the toothed wheels 56 engaging successively the teeth 60 move the crosshead beam along the guides 59, during which movement the beam is supported and guided by the rollers 58. The shaft or shafts of the stirring implement or implements are fixed to the beam in accordance with Fig. 1 and, consequently, the same movement is imparted to the implements, as described above with reference to the figure last mentioned. Also by means of the device shown in Figs. 4 and 5 the stirring implements may be caused to operate one after another or in any desired order. This may be effected by means of a suitable or known electric connecting device, which, in the desired order, closes the current of the said electric motors or causes to operate the electro-magnets of electric clutches provided between the motors and the driving shafts respectively. The said connecting device and the circuits and clutches belonging to the same are not described as they form no part of this invention. It may be mentioned however, that the crosshead beam, when returned to its initial position, shown in Fig. 4, effects the breaking of the current.

As stated above many other means than those described above may be used for actuating the stirring implements. For instance suitably arranged screw gearings or spur gearings or combinations of such gearings may be used. For causing the stirring implements to operate one after another or in a certain order clutches may be provided between the driving shafts and the stirring implements respectively which clutches may be caused to operate mechanically, by means of electro-magnets and so on or, in accordance with the above statements, motors belonging to the implements respectively may be started or stopped in a desired order or clutches provided between the motors and the driving shafts respectively may be engaged and disengaged in the desired order by means of a suitable or known electric connecting device, which is not described, as it forms no part of this invention. A hydraulic device may also be used for the actuating of the stirring implements, a suitable mechanism being then provided which in the desired order admits the driving medium to the cylinders belonging to the stirring implements respectively.

The stirring implements 17 stated above are adapted, as to their construction, to the nature of the matter to be treated. Thus for instance for a matter, which is finely pulverized or consists of solid, hard pieces, implements provided with pins at comparatively great distances one from another may be used, the pins being if necessary located in a row or in a plurality of rows, situated in a zigzag order one behind another. The cross section of the said pins may be round, elliptical, triangular or of any other shape. For a matter of a sticking consistency implements are preferably used which are provided with plow-shaped, oblique blades, which turn up the matter. A stirring implement provided with blades of the said type is shown in Figs. 7 and 8. The blades 61 and the plate 62 carrying the same may be made integral for instance by casting. The blades 61 have a special shape. They may be considered as made of a prismatical body, the cross section of which is tri-angular, having one $a$ of its points directed forward. One side $b$ of the triangle extends transversally of the implement and the rear side $c$ extends longitudinally of the same, the sides $b$ and $c$ being perpendicular to the plate 62. The rear portion of the prismatical body is cut off in an oblique direction from beneath upward so that a lower surface or end surface $a, d, e, f,$ is left. The portion cut off may extend to the plate 62. The fore surface $g$ of the prismatical body is not at right angles to the plate 62, but it may be considered to be formed by a line moved parallel thereto from the lower side of the prismatical body toward the plate 62, the one end of the said line following the point $a$ and the other end of the said line approaching the side b, so that the oblique position of the side g with relation to the moving direction of the stirring implement diminishes upwardly during the stirring operation. The rear edge e, d, of the end surface a, d, e, f, may be beveled. The blades 61 are located in a row or, as shown, in two (or more) rows and in a zigzag order and may be so mounted that the set of blades, located at one side of the central line x to y of the implement extending in the motion direction of the same is a reflected image of the set of blades located at the opposite side of the said line, the blades being located symmetrically with relation to the said line. Owing to the fact that the blades 61 have a comparatively small bottom surface a, d, e, f the blades are able to crush lumps in the matter and not slide up the same, raising the implement and besides the implement may, without the shaft to which it is fixed having practically and economically unsuitable dimensions, be able to effect a pressure on the shelf of an intensity sufficient to prevent the matter from being piled on the shelf. While the implement is returned in the manner stated above the blades will not move any part of the matter backward, due to the fact that the rear, bottom corner of the blades is cut off, as stated above, and consequently an increased distance between the bottom end of each blade and the matter is thereby gained.

Other forms of the implements may also be used. The said pins or blades are located preferably in such manner, that they leave no parts of the matter untouched during the movement of the implement. The implements are fixed to the shafts by means of keys or nuts or a combination of the same or in any other suitable manner.

The means and devices described above are suitable especially in furnaces for the producing of calcium cyanamid.

Having now described our invention, what we claim as new and desire to secure by Letters Patent is:

1. In a furnace for effecting reactions between one or more solid substances and one or more gaseous substances the combination of a stirring implement, a rotary body mounted at an opening in the wall of the furnace, packing means provided between the said rotary body and the said wall, an opening provided in the said rotary body through which the shaft of the said implement is passed, and packing means provided between the said shaft and the said body.

2. In a furnace for effecting reactions between one or more solid substances and one or more gaseous substances the combination of a support for the matter, a stirring implement, a rotary body mounted at an opening in the wall of the furnace, packing means provided between the said rotary body and the said wall, an opening provided in the said rotary body, through which the shaft of the stirring implement is passed, packing means provided between the said shaft and the said body, a guide, a crosshead beam, which is movable in the said guide and to which the said shaft is fixed, and means for moving the said beam in the said guide, the guide being so shaped, that it imparts to the implement movements in various directions.

3. In a furnace for effecting reactions between one or more solid substances and one or more gaseous substances the combination of a support for the matter, a stirring implement, a rotary body mounted at an opening in the wall of the furnace, packing means provided between the said rotary body and the said wall, an opening provided in the said rotary body through which the shaft of the said implement is passed, packing means provided between the said shaft and the said body, a guide, a crosshead beam, which is movable in the said guide and to which the said shaft is fixed, an electric motor mounted on the said beam, a toothed wheel journaled on the said beam, means for transmitting motion from the motor to the said wheel, and teeth provided along the said guide and engaged by the said toothed wheel, the said guide being so shaped that it imparts to the implement movements in various directions.

4. In a furnace for effecting reactions between one or more solid substances and one or more gaseous substances the combination of shelves, located one above another, stirring implements moving the matter from shelf to shelf, guides, crosshead beams, which are movable in the said guides and to which the shafts of the implements are fixed, electric motors mounted on the said beams, toothed wheels journaled on the said beams, means for transmitting motion from the motors to the said wheels, teeth provided along the said guides and engaged by the said wheels, and means for causing the motors to operate in a desired order.

5. In a furnace for effecting reactions between one or more solid substances and one or more gaseous substances, the combination of a stirring implement, a rotary body mounted at an opening in the wall of the furnace, packing means provided between the said rotary body and the said wall, an opening provided in the said rotary body through which the shaft of the said implement is passed, packing means provided between the said shaft and the said body, means for reciprocating the said implement and a plurality of pins on the implement arranged in a plurality of rows and in a zigzag order.

6. In a furnace for effecting reactions between one or more solid substances and one or more gaseous substances the combination of a stirring implement, means for reciprocating the said implement and blades provided on the implement and located in a plurality of rows and in a zigzag order, the said blades being plow-shaped at their front side and cut off at their back in an oblique direction rearward from the bottom side of the blade.

7. In a furnace for effecting reactions between one or more solid substances and one or more gaseous substances the combination of a stirring implement, a rotary body mounted at an opening in the wall of the furnace, packing means provided between the said rotary body and the said wall, an opening provided in the said rotary body through which the shaft of the said implement is passed, packing means provided between the said shaft and the said body, means for reciprocating the said implement and blades provided on the implement and located in a plurality of rows and in a zigzag order, the said blades being plow-shaped at their front side and cut off at their back in an oblique direction rearward from the bottom of the blade.

In testimony whereof, we have hereunto signed our names.

OSCAR FREDRIK SVANTE CARLSON.
OSCAR IVAR CARLSON.
KARL GOTTFRID BOMAN.

Copies of this patent may be obtained for five cents each, by addressing the "Commissioner of Patents, Washington, D. C."